United States Patent [19]

Nakamura

[11] Patent Number: 5,802,384
[45] Date of Patent: Sep. 1, 1998

[54] VECTOR DATA BYPASS MECHANISM FOR VECTOR COMPUTER

[75] Inventor: Toshihiko Nakamura, Yamanashi, Japan

[73] Assignee: NEC Corporation, Tokyo, Japan

[21] Appl. No.: 522,589

[22] Filed: Sep. 1, 1995

[30] Foreign Application Priority Data

Sep. 2, 1994 [JP] Japan ................. 6-209961

[51] Int. Cl.$^6$ ................. G06F 9/40; G06F 15/16
[52] U.S. Cl. ................. 395/800.05; 395/800.04; 395/800.06; 395/800.07
[58] Field of Search ................. 395/800, 376, 395/392, 394, 800.04, 800.05, 800.06, 800.07

[56] References Cited

U.S. PATENT DOCUMENTS

| | | | |
|---|---|---|---|
| 4,761,754 | 8/1988 | Kinoshita | 364/736 |
| 4,837,730 | 6/1989 | Cook et al. | 395/800.07 |
| 4,888,679 | 12/1989 | Fossum et al. | 395/800.06 |
| 5,019,969 | 5/1991 | Izumisawa et al. | 364/DIG. 1 |
| 5,151,995 | 9/1992 | Garcia | 395/800 |
| 5,333,281 | 7/1994 | Nishikawa et al. | 395/394 |
| 5,555,384 | 9/1996 | Roberts et al. | 395/392 |
| 5,590,365 | 12/1996 | Ide et al. | 395/394 |

FOREIGN PATENT DOCUMENTS 0 136 597  4/1985  European Pat. Off. .

OTHER PUBLICATIONS

Okamoto et al., "A 200–MFLOPS 100–MHZ 64–BiCMOS Vector–Pipelined Processor (VPP) ULSI" IEEE Journal of Solid–State Circuits, vol. 26, No. 12 1885–1893, (1991).

*Primary Examiner*—Alyssa H. Bowler
*Assistant Examiner*—John Follansbee
*Attorney, Agent, or Firm*—Foley & Lardner

[57] ABSTRACT

A bypass mechanism in a vector computer is disclosed. The vector register bypasses data to be written in the inner registers from input or output of the write data register. The bypass mechanism is mainly realized by a selector and a decoder. The selector selects any one of data to be written in the registers at the timing before 2 cycles, data to be written in the registers at the timing before 1 cycle, and the read data from the registers. The decoder controls the selector according to a mask signal from the mask register; a signal of a timing which is before one cycle of the mask signal, and a bypass signal from said controller.

1 Claim, 6 Drawing Sheets

FIG. 3

| BYPASS SIGNAL 3111 | MASK 401 | WRITE ENABLE 3131 | SEL-A | SEL-B | SEL-C |
|---|---|---|---|---|---|
| 0 0 | X | X | 1 | 0 | 0 |
| 0 1 | X | 0 | 1 | 0 | 0 |
|     |   | 1 | 0 | 1 | 0 |
| 1 0 | 0 | X | 1 | 0 | 0 |
|     | 1 | X | 0 | 0 | 1 |

VECTOR DATA BYPASS MECHANISM FOR VECTOR COMPUTER

BACKGROUND OF THE INVENTION

1. Field of the Invention

The present invention relates to a vector data bypass mechanism in a vector computer, and more particularly to a mechanism for a vector computer having a vector mask register.

2. Description of the Related Art

The vector computer is generally equipped with a plurality of processing units and a plurality of vector registers, for processing a large quantity of one-group data. Referring to FIG. 1, the vector computer which is applicable to the present invention includes a control unit 100, a main storage 200, a vector register unit 300, a mask register 400, and a plurality of execution units 500. The control unit 100 controls the entire vector computer in accordance with a command from the outside of the vector computer. The main storage 200 stores vector data. The vector register unit 300 is located between the main storage 200 and the execution unit 500 so as to hold the vector data. The vector register unit 300 includes a plurality of vector registers 310 and a network 320 connecting between those vector registers 310 and the execution unit 500. The each element of mask register 400 shows whether or not a designated processing is to be masked, in association with the element of each vector register. Each of the m execution units 500 includes pipelined ALUs (arithmetic and logic units).

Referring to FIG. 5, the vector register in a conventional vector computer includes a controller 311, a read address register 312, a write enable register 313, a write address register 314, a write data register 315, registers 316, a read data register 319 and a selector 309. The controller 311 generates a read address or write address on the basis of a command control signal 101 from the control unit 100. The command control signal 101 contains the type of a command (for example, a load command or an addition command) and an address information (for example, a start address, a distance or a vector length), etc. The read address register 312 holds a read address for the registers 316. The write enable register 313 holds data from the mask register 400, and gives to the registers 316 a command as to whether the data is to be written therein, or not. The write address register 314 holds the write address for giving it to the registers 316. The write data register 315 holds data which is to be written into the registers 316. The registers 316 have a plurality of words and holds vector data. The read data register 319 holds data which is read out from the registers 316. The selector 309 selects any one of data from the main storage 200 and data from the execution unit 500 through the network 320.

In the conventional vector computer, in the case where data is written into the vector register, any one of the data from the main storage 200 and data from the execution unit 500 through the network 320 is selected and held in the write data register 315 once. Then, the contents of the write data register 315 are written into an address of the registers 316, which is indicated by the write address register 314. The element which is indicated to be invalid in the write enable register 313 is not written thereinto.

In that conventional vector computer, in the case of reading data from the vector register, data is held in the read address register 312 once. As a result, an address is given to the registers 316, and the read data is held in the read data register 319.

Accordingly, in the conventional vector computer, when data written into the vector register in accordance with a certain preceding command is read in accordance with a succeeding command, the data cannot be read unless the data has been written into the registers 316 once. In other words, in the case where the commands having the foregoing the read-after-write relationship are processed time-apart from each other, there arises no problem. However, if both the commands are time-adjacent to each other, it may cause the succeeding command to wait. In this case, the performance is adversely affected.

SUMMARY OF THE INVENTION

The present invention has been made to solve the foregoing problems, and therefore an object of the invention is to provide a vector data bypass mechanism which processes a succeeding command, which refers to the execution result of a preceding command, at a high speed.

Another object of the present invention is to provide a vector computer which can vary a reading timing from a vector register flexibly.

In one preferred embodiment, a vector computer in accordance with the present invention comprises bypass means for bypassing data to be written in a register within a vector register; a selector for selecting any one of data from the register and data from the bypass means; and a decoder for generating a control signal for the selector in accordance with bypass information and mask information.

BRIEF DESCRIPTION OF THE DRAWINGS

One embodiment of the present invention will become apparent with the description referring to the following drawings.

FIG. 3 is a diagram showing a truth table of a decoder in accordance with the present invention;

DETAILED DESCRIPTION OF THE PREFERRED EMBODIMENTS

One embodiment of the present invention will be described with reference to the accompanying drawings.

Figure 1:
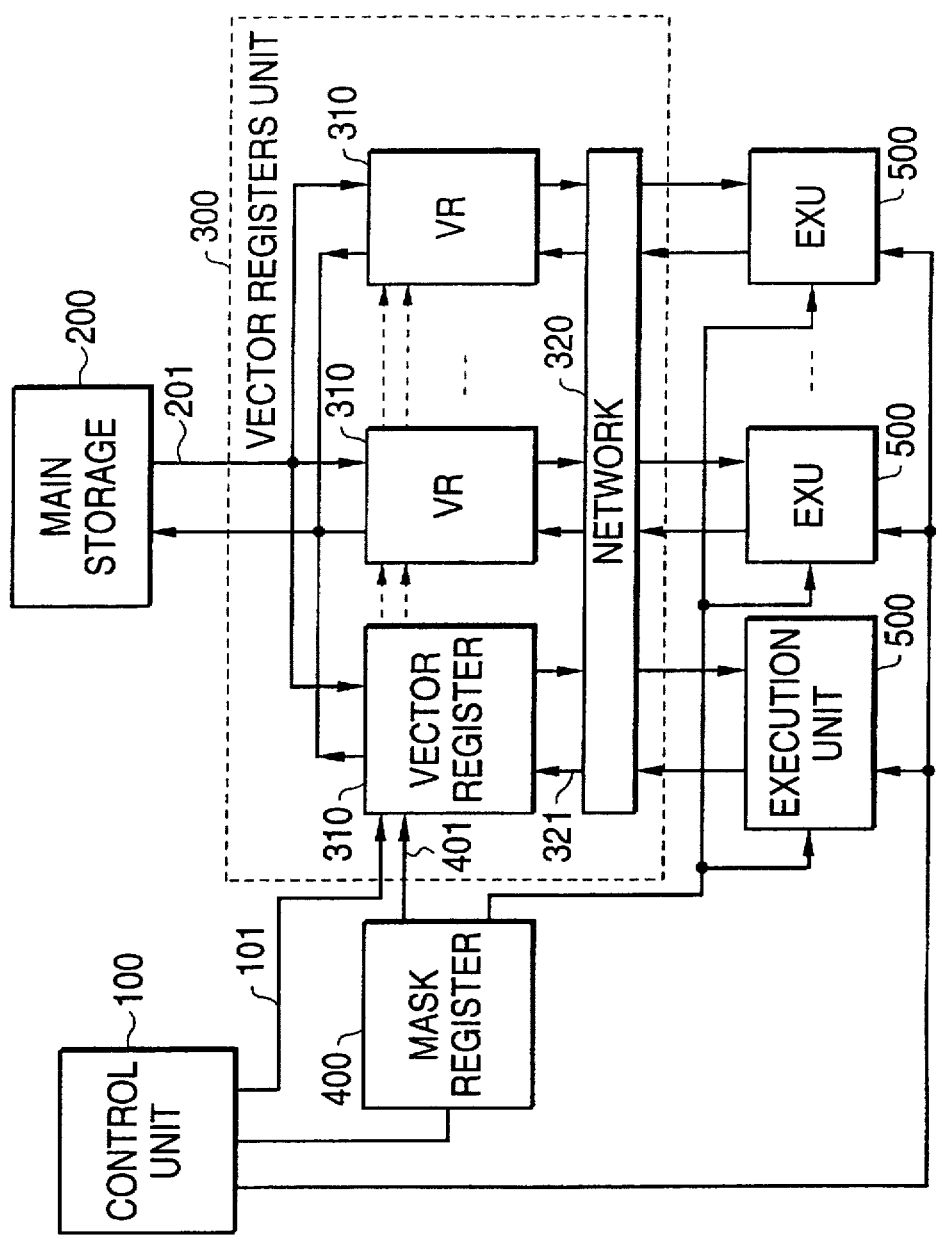
FIG. 1 is a block diagram showing the entire construction of a vector computer used in the present invention.

Referring to FIG. 1, a vector computer in accordance with an embodiment of the present invention includes a control unit 100, a main storage 200, a vector register unit 300, a mask register 400, and m (m is an integer) execution units 500. The control unit 100 controls the entire vector computer in accordance with an external command. The main storage 200 mainly stores vector data. The vector register unit 300 is located between the main storage 200 and the execution unit 500 so as to hold the vector data. The vector register unit 300 includes n (n is an integer) vector registers 310 and a network 320 connecting between those vector registers 310 and the execution unit 500. The network 320 may be of a bus structure or of a structure using a cross-bar switch. Each element of mask register 400 shows whether or not a designated processing is to be masked, in association with the element of each vector register. Each of the m execution units 500 includes pipelined ALUs.

Figure 2:
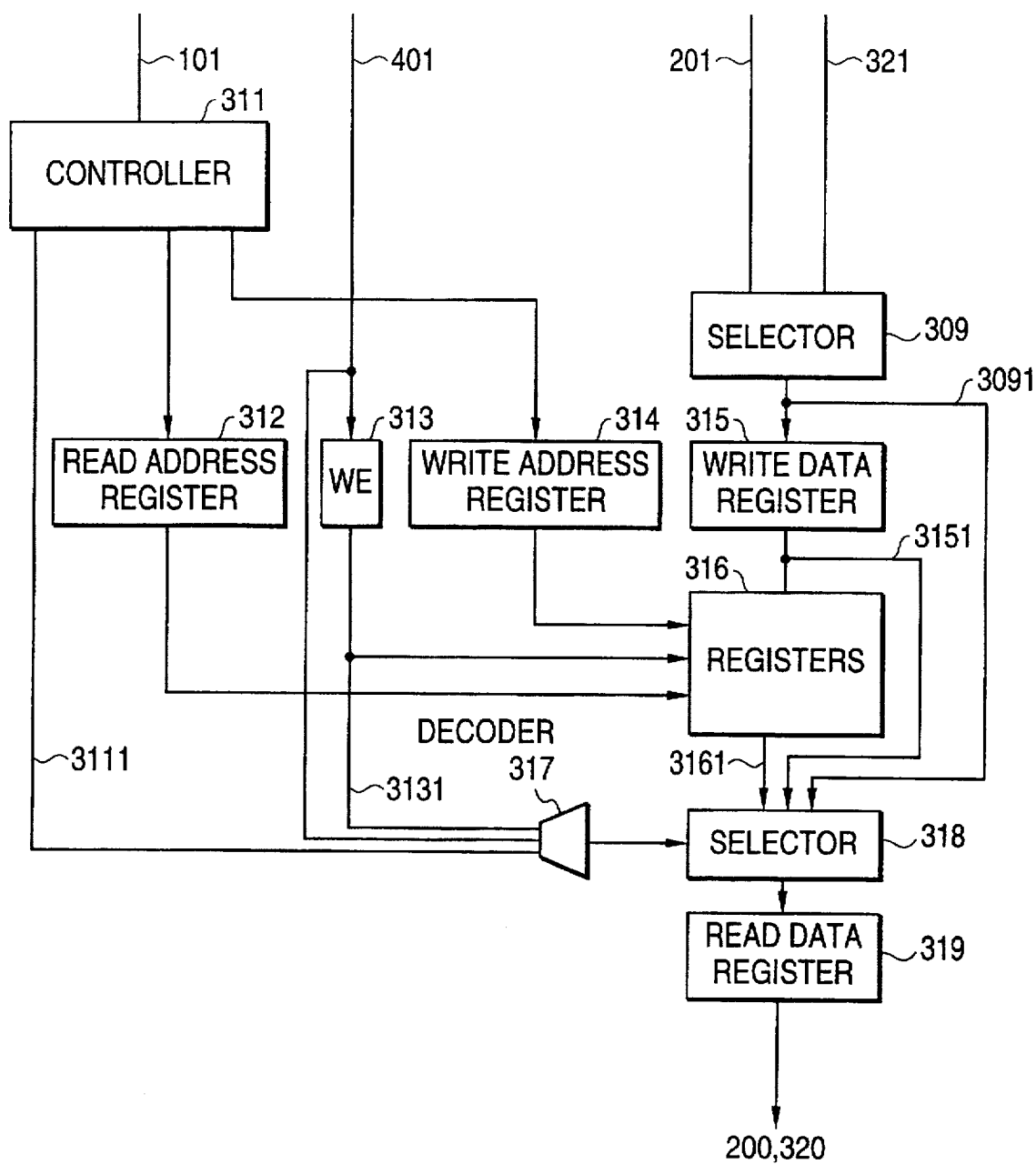
FIG. 2 is a block diagram showing the construction of a vector register in accordance with the present invention.

Referring to FIG. 2, the vector register 310 includes a controller 311, a read address register 312, a write enable register 313, a write address register 314, a write data register 315, registers 316, a decoder 317, a selector 318, a read data register 319 and a selector 309. The controller 311 generates a read address or a write address on the basis of a command control signal 101 from the control unit 100. Also, the controller 311 further bypasses data to be written in the registers 316 and designates a timing at which the data is read by the read data register 319. The read address register 312 holds a read address for the registers 316. The write enable register 313 holds data from the mask register 400, and gives to the registers 316 a command as to whether the data is to be written therein, or not. The write address register 314 holds the write address for giving it to the registers 316. The write data register 315 holds data which is to be written into the registers 316. The registers 316 have a plurality of words and holds vector data. The selector 318 selects data from the registers 316 or its bypass data. The decoder 317 indicates to the selector 318 data to be held in the read data register 319 on the basis of a timing to be bypassed and a state of the mask register. The read data register 319 holds data read out from the registers 316. The selector 309 selects any one of data transmitted from the main storage 200 and data transmitted from the execution unit 500 through the network 320.

The decoder 317 generates a control signal for the selector 318 in accordance with the truth table shown in FIG. 3. In other words, the decoder 317 inputs a bypass signal 3111 from the controller 311, a mask signal 401 from the mask register 400 and a write enable signal 3131 from the write enable register 313 to generate selection signals SEL-A, B and C.

In this example, it is assumed that the bypass signal 3111 indicates "00" when it is not bypassed, "01" when it is bypassed by one cycle, and "10" when it is bypassed by two cycles. A timing for bypassing is determined in accordance with timing between the preceding command and the succeeding command when a command is issued or the like. Also, the mask signal 401 and the write enable signal 3131 indicate "1" when corresponding data is valid, but "0" when it is invalid.

The SEL-A becomes "1" when data from the registers 316 is to be selected. The SEL-B becomes "1" when data from the write data register 315 is to be selected. The SEL-C becomes "1" when data from the selector 309 is to be selected.

Referring to FIG. 3, when the bypass signal 3111 indicates "no bypassing," the output of the registers 316 is selected. Also, even though it indicates "bypassing," if the write enable signal corresponding to that bypass timing, that is, the mask signal 401 or the write enable signal 3131, indicates "invalid," the output of the registers 316 is selected as well. Inversely, if the write enable signal corresponding to that bypass timing indicates "valid," the processing is bypassed. In other words, if the bypass timing is of one cycle, the output of the write data register 315 is selected whereas, if the bypass timing is two cycles, the output of the selector 309 is selected.

The vector data from the main storage 200 is held in the write data register 315 once after being selected by the write data register selector 309. It is assumed that the registers 316 is comprised of a storage element which requires a period of one cycle for writing and reading. In the writing of data, the write enable signal 3131 and the write address signal are outputted from the write enable register 313 and the write address register 314, respectively. As a result, the vector data outputted from the write data register 315 is written at a position of an designated element of the registers 316. In the reading of data, data is read out from the position of the designated element of the registers 316 on the basis of the read address signal outputted from the read address register 312.

In the case of storing data in the vector register, as described above, the vector data 3091 is successively held into the write data register 315 of the vector register 310. Then, a mask signal 401 representing the presence/absence of the validity of that vector data is held in the write enable register 313 synchronized with that vector data 3091. The mask signal 401 is simultaneously inputted into the decoder 317. On the other hand, the bypass signal 3111 from the controller 311 is inputted into the decoder 317 synchronized with the vector data 3091 and the mask signal 401. Also, the write address signal which designates the position of an element within the registers 316 for storing the vector data 3091 is generated from the controller 311 synchronized with the vector data 3091 and the mask signal 401, and then held in the write address register 314.

The registers 316 receive vector data 3151 inputted from the write data register 315 as well as the write enable signal 3131 inputted from the write enable register 313. Then, in the case where the write enable signal 3131 indicates "valid," the value of the write data register 315 is written at the position of the element of the registers 316 designated by the address signal which is inputted from the write address register 314. In the case where the write enable signal 3131 designates "invalid," the writing of that vector data is not implemented, and data which has been stored at the position of the element originally designated is held as it is. The write addresses of the number corresponding to the number of vector elements which are designated by the command control signal 101 are sequentially generated in the controller 311, and then held in the write address register 314.

In the case where data is read out from the vector register, the read address for each data is generated in the controller 311 upon the reception of a read request outputted from the command control signal 101, and then held in the read address register 312. In the registers 316, the corresponding data is read out from the position of the element which is designated by the read address signal from the read address register 314. The read data is held in the read data register 319 through the selector 318. Then, the vector data outputted from the read data register 319 is successively outputted to the execution unit 500 or the main storage 200.

Subsequently, a description will be given of an operation in the case where the vector data obtained as a result of processing in accordance with the preceding command coincides with the vector data which has been designated as a reference operand in the succeeding command.

Referring to FIG. 2, the vector data 321 outputted from the execution unit 500 is successively held in the write data register 315 through the selector 309. Simultaneously, the vector data is also inputted to the selector 318 through a signal line 3091. The mask signal 401 representing the validity of the vector data 321 is held in the write enable register 313 synchronized with the vector data 321. The mask signal is also inputted to the decoder 317, simultaneously. Then, the control unit 100 also refers to the succeeding command as well as the operating state of a resource used by the succeeding command. Thereafter, if the control unit 100 judges that the processing by the succeeding command is executable instantaneously, a read-out request is outputted so that the read-out operation of the succeeding command is started simultaneously when the head element of the vector data which is obtained as the operating result of the preceding command is outputted. Upon receipt of the read-out request, the controller 311 outputs the read address signal. The read address signal is held in the read address register 312. On the other hand, the bypass signal 3111 is outputted from the controller 311 before being inputted to the decoder 317.

The decoder 317 receives the bypass signal 3111 outputted from the controller 311, the mask signal 401 inputted synchronized with the vector data 3091, and the write enable signal 3131 from the write enable register 313. With the operation described above with reference to FIG. 3, the decoder 317 outputs the control signals SEL-A, B and C of the selector 318. The selector 318 selects the vector data from any one of the registers 316, the write data register 315 and the selector 309 in response to the selection signal from the decoder 317. The selected data is held in the read data register 319.

The controller 311 sequentially generates the write address signal of the preceding command and the read address signal of the succeeding command. Then, the decoder 317 selects the read data in response to the contents of the mask register 400 and the cycle of the designated bypass. As described above, a sequence of write/read operation for the registers 316 is executed repeatedly successively by the number of elements designated by the command control signal 101.

Subsequently, a description will be given of an operation of the vector computer in accordance with the foregoing embodiment of the present invention.

Figure 4:
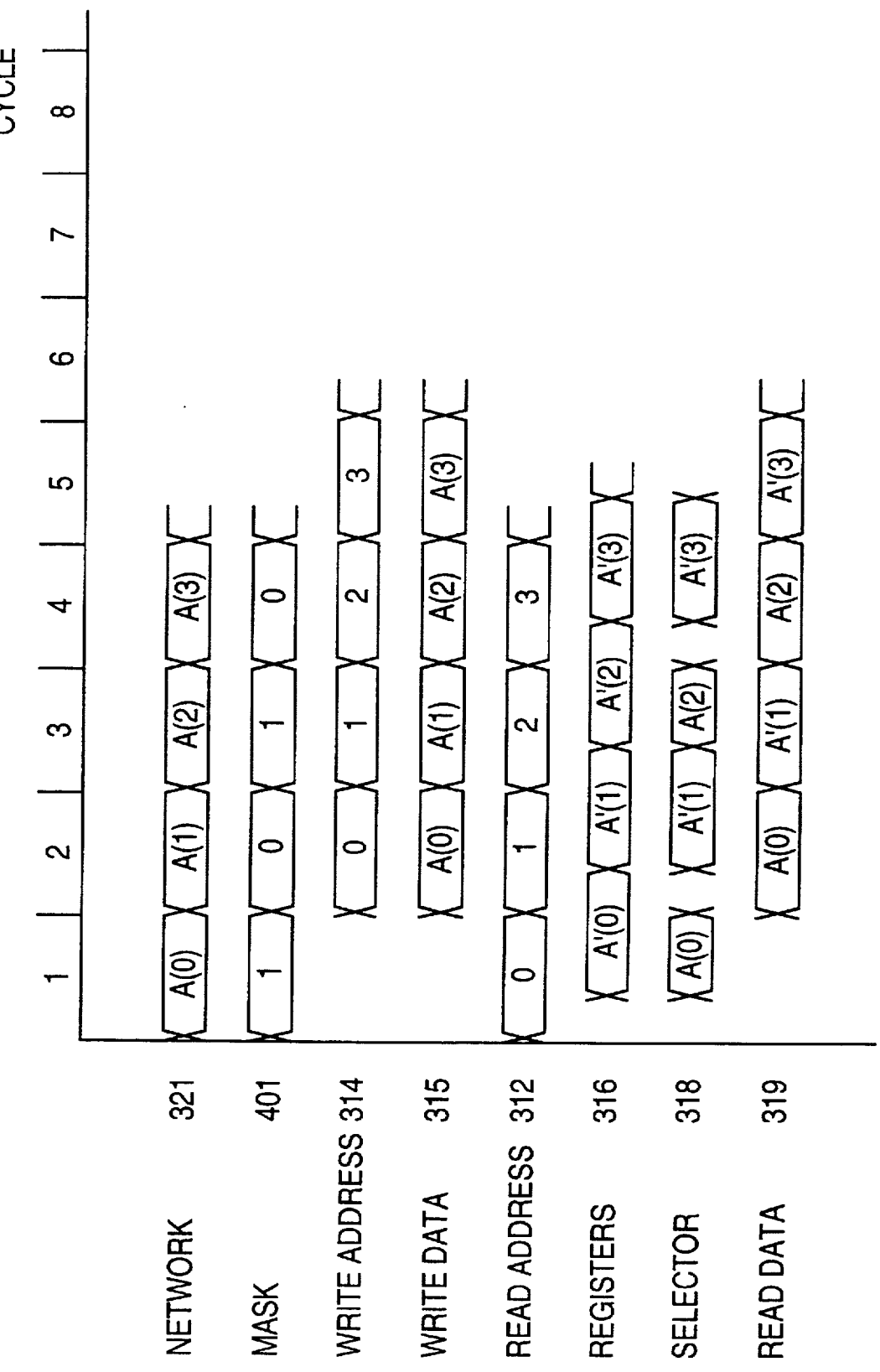
FIG. 4 is a timing chart showing an operating timing of each element in accordance with the present invention.
Figure 5:
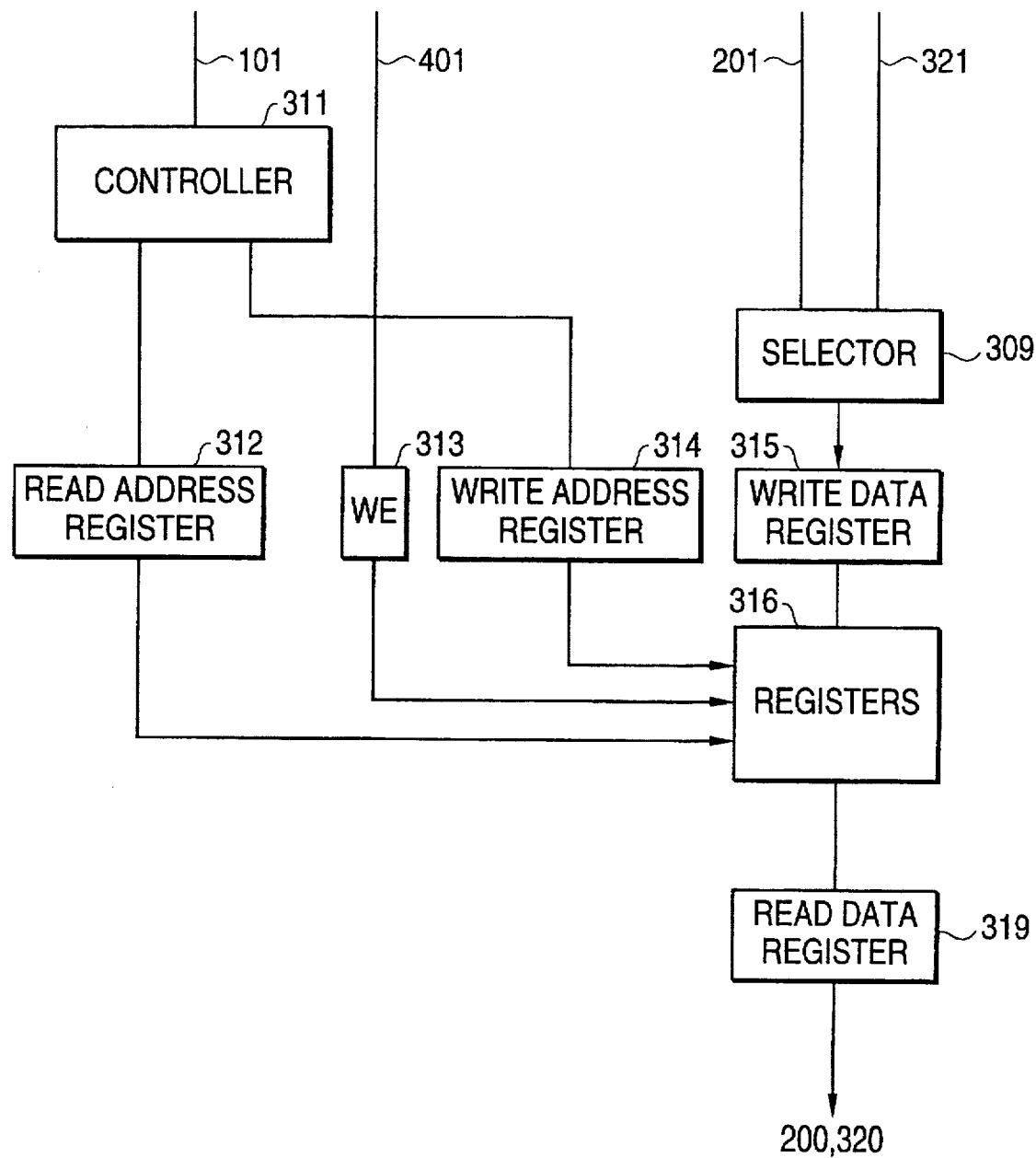
FIG. 5 is a block diagram showing the construction of a vector register in a prior art.

Referring to FIGS. 1, 2 and 4, the control unit 100 which has received a predetermined command outputs the command control signal 101. The command control signal 101 is inputted into the respective vector registers 310. In each of the vector registers 310, the command control signal 101 is received by the controller 311. In this situation, it is detected that the vector data as a result of processing in accordance with the preceding command coincides with the vector data designated as the reference operand in the succeeding command, and it is assumed that "10", that is, "2-cycle bypass" is designated as the bypass signal.

In a first cycle, the result data A (0) generated in the execution unit 500 is inputted to the respective vector registers 310 through the network 320. Also, at the same timing, the contents of the head element of the mask register 400 are inputted into the respective vector registers 310 through the signal line 401. The controller 311 generates the read address 0 corresponding to the head element of the succeeding command at a timing earlier than the foregoing timing by one cycle and holds it in the read address register 312. As a result, the data at the address 0 is read from the registers 316 at the same timing as that of the result data A(0) from the foregoing execution unit 500. It should be noted that because the result data of the preceding command is not yet reflected by the registers 316, its preceding state is read. Hereinafter, that data is represented as "A' (0)" or the like. The selector 318 selects the output 3091 of the selector 309 complying with the table of FIG. 3, since the bypass signal 3111 is "10", and the value of the mask register 400 is "1." The selected data A(0) is held in the read data register 319, and sent to the execution unit 500 for processing the succeeding command. It should be noted that the result data A(0) generated by the execution unit 500 is stored in the registers 316 through the write data register 315 in the second cycle.

In the second cycle, the result data A (1) generated by the execution unit 500 is inputted to the respective vector register 310 through the network 320. Also, at the same timing, the contents of the second element of the mask register 400 is inputted to the respective vector register 310 through the signal line 401. The controller 311 generates the read address 1 corresponding to the second element of the succeeding command of the succeeding command at a timing earlier than the foregoing timing by one cycle and holds it in the read address register 312. As a result, the data A'(1) at the address 1 is read from the registers 316 at the same timing as that of the result data A(1) from the foregoing execution unit 500. The selector 318 selects the output 3161 of the selector 316 complying with the table of FIG. 3, since the bypass signal 3111 is "10" and the value of the mask register 400 is "0." The selected data A'(1) is held in the read data register 319, and sent to the execution unit 500 for processing the succeeding command. It should be noted that the result data A(1) generated by the execution unit 500 is held in the write data register 315 once. However, since the second element of the mask register 400 is "0," it is not written into the registers 316. Accordingly, the data A'(1) is stored in the address 1 of the registers 316 as it is.

Similarly, in the cycles subsequent to the foregoing cycle, the result data from the execution unit 500 or the data from the registers 316 is selected by the selector 317, and successively held by the read data register 319 before being sent to the execution unit 500.

Figure 6:
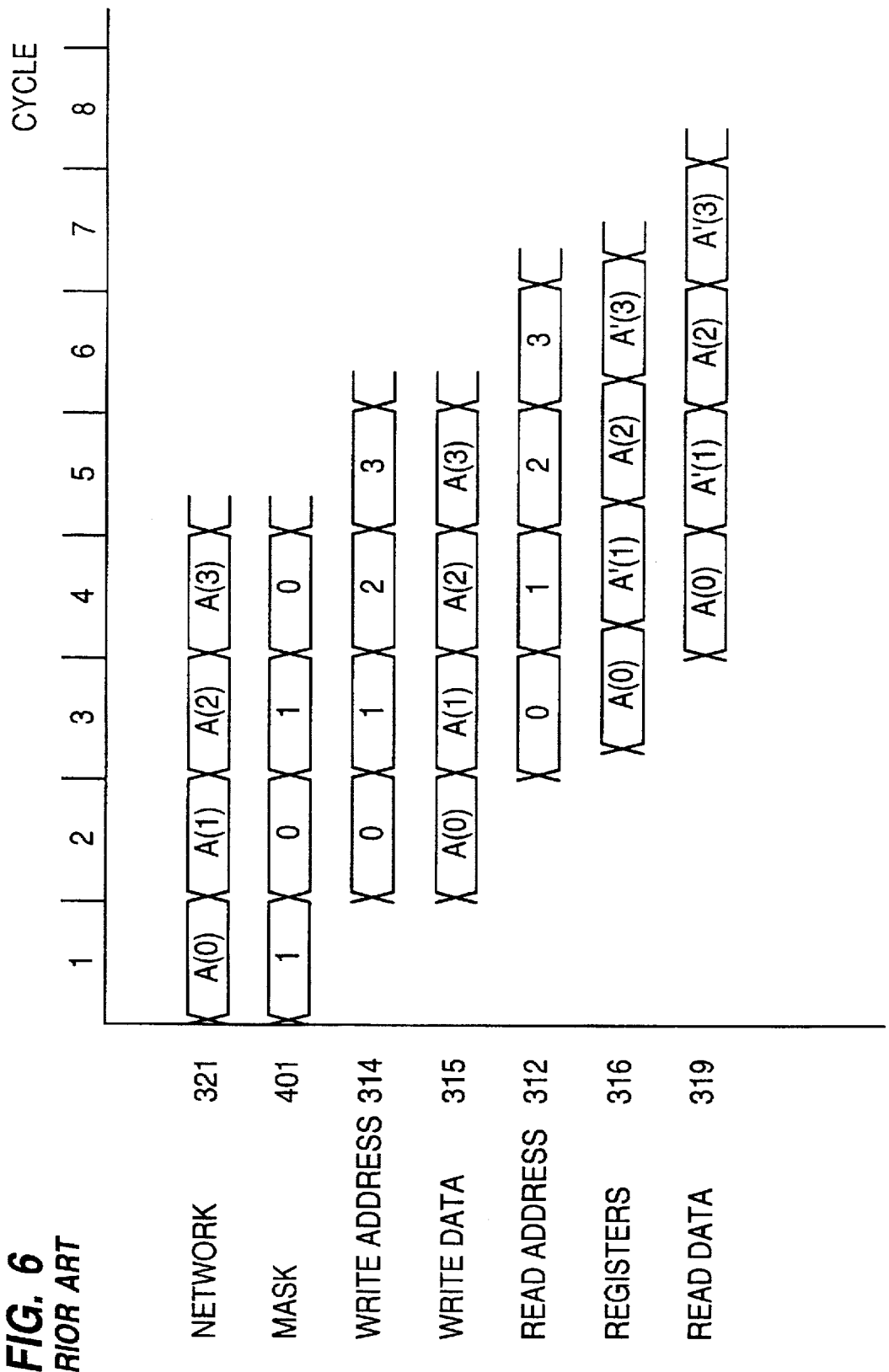
FIG. 6 is a timing chart showing an operating timing of each element in the prior art.

On the other hand, by referring to FIG. 6, in the timing chart of the prior art, data A(0) sent through the network 321 from the execution unit 500 in the first cycle is held in the write data register 315 and written in the registers 316 in the second cycle. Accordingly, if the data A(0) is read from the registers 316 with no bypass, it takes the third cycle at the earliest. Consequently, A(0) is sent to the execution unit 50 in the fourth cycle.

Accordingly, comparing FIG. 4 showing the timing chart in accordance with the embodiment of the present invention with FIG. 6 showing the timing chart in the prior art, it is understood that the transfer timing of the vector data for the execution unit 500 of the present invention is reduced by 2 cycles.

It should be noted that, in order to reduce the data transfer to the execution unit 500 by not 2 cycles but 1 cycle, the bypass signal 3111 must be set to "01." Furthermore, the timing of the read address output from the controller 311 may be delayed by one cycle compared with that described in FIG. 6.

As was described above, according to the present invention, in the case where the vector data generated by the preceding command is referred to in the succeeding command, even before the vector data by the preceding command is written in the vector register and decided, the data can be read in accordance with the succeeding command. As a result, a sequence of write/read operation in the vector processing can be performed at a high speed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vector computer, comprising:

a vector register unit including a plurality of vector registers for holding vector data;

a mask register for holding mask information corresponding to said vector data;

a plurality of execution units;

said vector register unit including at least one vector register connected to each of said execution units, wherein each of said vector registers comprises:

a plurality of data registers for holding said vector data;

bypass means for making data to be written into one of said data registers bypass said data register, a selector for selecting any one of data from said data registers and data from said bypass means in accordance with a control signal;

a controller for generating a read address and a write address for said data registers to designate a bypass timing; and a decoder for generating said control signal for said selector according to said mask information corresponding to said vector data and said bypass timing;

a write data register for successively holding data from said execution unit; and a write enable register for successively holding the respective elements of said mask register, and wherein said decoder uses the input and the output of said write enable register as said mask information, and controls said selector, in the case where no bypass is designated as said bypass timing, so that the output of said data registers is selected for said selectors, and in the case where the bypass of one cycle is designated as said bypass timing, selects data from said bypass means if the value of said mask register is valid, but selects the output of said data registers if the value of said mask register is invalid, and in the case where a bypass of 2 cycles is designated as said bypass timing, selects data from said means for bypassing the input of said write data register if the value of said mask register is valid, and selects the output of said data registers if the value of said mask register is invalid; and wherein said bypass means includes means for bypassing an input of said write data register, and means for bypassing an output of said write data register.

* * * * *